Oct. 8, 1929.    M. J. GLAUBER    1,730,455
SINK FIXTURE
Filed Feb. 6, 1926

Inventor
Myron J. Glauber
By Lyon & Lyon
Attorneys

Patented Oct. 8, 1929

1,730,455

UNITED STATES PATENT OFFICE

MYRON J. GLAUBER, OF LOS ANGELES, CALIFORNIA, ASSIGNOR TO BUCKNELL SUPPLY COMPANY, OF LOS ANGELES, CALIFORNIA, A CORPORATION OF CALIFORNIA, DOING BUSINESS AS SPHINX MANUFACTURING COMPANY

SINK FIXTURE

Application filed February 6, 1926. Serial No. 86,376.

This invention relates to sink fixtures or the like, and more particularly to a fixture in which means are provided for connecting a mixing member or chamber to inlets or supply pipes which extend horizontally through a vertical wall and which connecting means include a union which is slidably adjustable so as to permit variation of the centers of the connecting means to accommodate corresponding variations of centers of the horizontal supply pipes.

Another object of this invention is to provide a sink fixture in which means are provided for mounting an escutcheon in position to hide from view the connecting means employed so that the horizontal supply pipes may be extended through the vertical wall through holes considerably larger than that required for the extension of the pipes therethrough so that as necessity requires the horizontal supply pipes may be sprung into position to enable connection of the same with the sink fixture.

Another object of this invention is to provide a union which is adjustable by means of a sliding fit so that two pipes may be connected together rigidly and in a fluid tight relation, which pipes have their centers staggered.

Other objects and advantages of this invention will be apparent from the following detailed description of a preferred embodiment thereof, as illustrated in the accompanying drawings, in which drawings.

Figure 1:
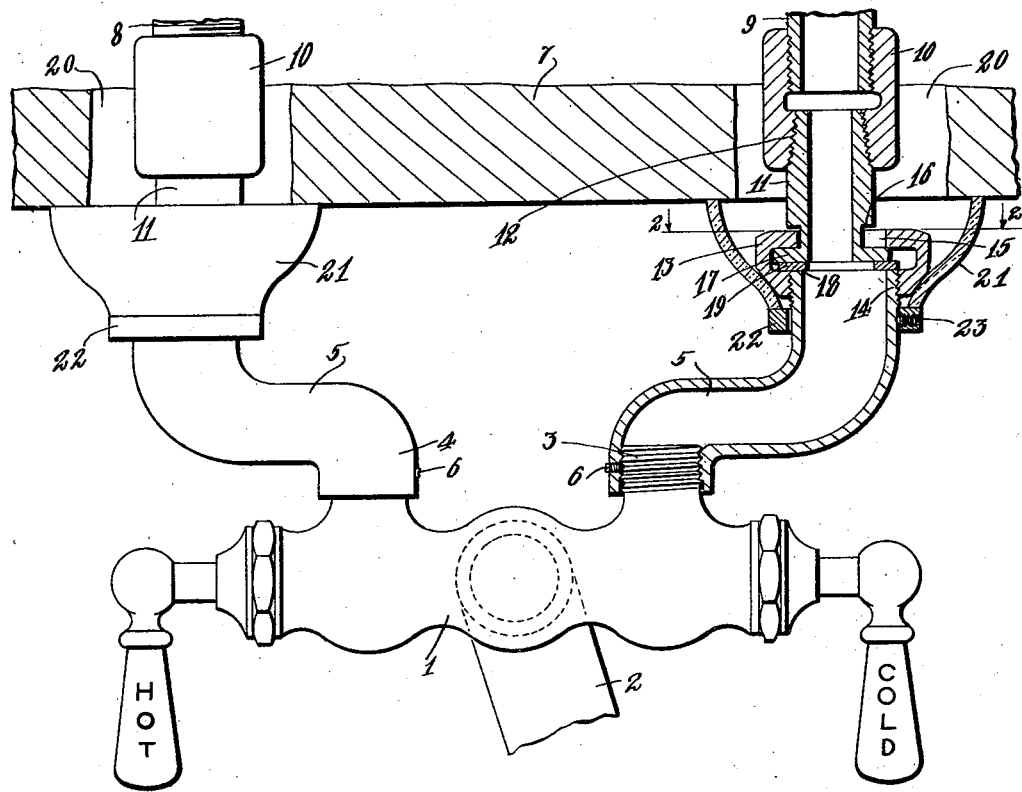
Figure 1 is a top plan view partly in vertical mid section of a sink fixture embodying this invention.
Figure 2:
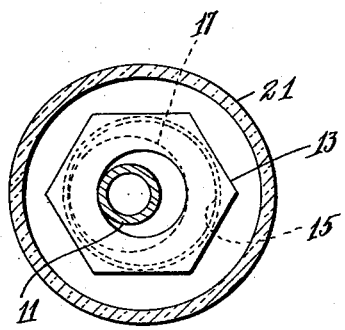
Fig. 2 is a cross section taken substantially on the line 2—2 of Figure 1.

In the preferred embodiment of this invention illustrated in the accompanying drawings, 1 illustrates a mixing member which provides a mixing chamber for the mixing of hot and cold water prior to their admission into a swinging spout 2 which is connected therewith. The mixing member 1 is provided with valves at its opposite ends to control the inlets 3 and 4 thereof, which construction is well understood in the art so as not to require applicant to specifically point out and describe the same. A curved pipe 5 is connected to each outlet 3 and 4 by any suitable means such as screw-threading the same thereto and the pipe 5 may be and preferably is rigidly affixed to the outlet 3 by any suitable means such as sweating the connection or by the employment of a set screw 6. Thus affixed the curved pipe 5 is maintained rigidly affixed in horizontal position. Extending through the vertical wall 7 are hot and cold supply pipes 8 and 9 which it is desired to connect with the curved pipes 5 which are secured to the inlets 3 and 4 of the mixing chamber 1. Coupling members 10 are screw-threaded to the end of the pipes 8 and 9 and a connecting member 11 is secured to the coupling member 10 by any suitable means, such as screw-threading the same thereto as illustrated at 12. A connecting nut 13 is provided which is adapted to be screw-threaded to the end 14 of the curved pipe 5. The connecting nut 13 has an enlarged bore 15 formed at the end through which the member 11 is extended. The bore 15 in the particular embodiment set forth is adapted to register with the annular recess 16 formed in the member 11 so as to permit sliding of the member 11 transversely in the bore 15. The same result may be obtained by increasing the diameter of the bore 15 and eliminating the annular recesses 16. However, it is preferable to employ such an annular recess 16 in order to reduce the relative size of the connecting members. The connecting member 11 has a head 17 formed at its inner engaging end which is adapted to engage the end face 18 of the curved pipe 5. A packing ring 19 of any suitable or desirable construction is interposed between the head 17 and the end face 18. In order to permit the formation of enlarged holes 20 in the vertical wall 7 and in order to hide from view the slidable union connection described so as to eliminate the necessity of polishing the same, China bell escutcheons 21 are provided which are maintained in position by means of slip rings 22, which slip rings are firmly held in position to maintain the escutcheons 21 against the surface of the vertical wall 17 by means of set screws 23.

It will be obvious from the foregoing that I have provided a sink fixture which is adapted to be connected with horizontally extending supply pipes of varying centers without the provision of swinging members which are objectionable. It is often impossible due to the close proximity of window sills and the like to properly adjust such swinging or swivel connections because of the limited space permitted for the installation of such fixtures. It will also be obvious that I have provided a sink fixture which in all places may be connected in position to such horizontal supply pipes without depending upon threaded connections to maintain the same fluid tight and which threaded connections are required to be rotated to a particular position in order to accommodate the varying centers of the said supply pipes.

Having fully described a preferred embodiment of this invention it is to be understood that I do not wish to be limited to the exact details of description herein set forth which may obviously be varied without departing from the spirit of my invention as set forth in the appended claims.

I claim:

1. In a device of the class described, the combination of a mixing member having a pair of valved inlets, a pair of spaced horizontal supply pipes, curved connecting members secured to the said inlets, and coupling nuts slidable transversely of said supply pipes for connecting the said supply pipes with the said members.

2. In a device of the class described, the combination of a mixing member having a pair of valved inlets, a pair of spaced horizontal supply pipes, a connecting member rigidly secured to each inlet, and slidable coupling nuts adjustable transversely of the centers of the said supply pipes for securing each connecting member to a horizontal supply pipe.

3. In a device of the class described, the combination of a connecting member adapted to be secured to a supply pipe, a nut member slidably mounted on the said connecting member so as to permit adjustment of the nut member in a plane transverse to the center line of said supply pipe, and adapted to be screw-threaded to a second connecting member, and packing means interposed between the said connecting members.

4. In a device of the class described, the combination of a mixing member, a pair of horizontal supply pipes, and means, including a pair of coupling nuts, slidable transversely of the center lines of the said supply pipes for connecting the mixing member with the said supply pipes.

5. In a device of the class described, the combination of a mixing member, horizontal supply pipes, and means, including a coupling nut, slidable transversely of the center line of one of the said supply pipes for connecting the mixing member with the said supply pipes.

6. In a device of the class described, the combination of a mixing member, horizontal supply pipes, connecting members, means including coupling nuts slidable in a plane transverse to the center lines of said supply pipes, for connecting the mixing member with the said supply pipes, and escutcheons mounted on the connecting members for covering the said coupling nuts.

7. In a device of the class described, the combination of a pair of spaced horizontal supply pipes extending through enlarged holes formed in a vertical wall, a mixing member, connecting members, means including coupling nuts slidable in a plane transverse to the center lines of said supply pipes for connecting the mixing member with the said horizontal supply pipes, and escutcheon means mounted on the said connecting members and adapted to be held firmly against the said vertical wall for hiding the said coupling nuts.

8. In a device of the class described, the combination of a pair of spaced supply pipes, a coupling member secured to each supply pipe, a mixing member, curved connecting pipes secured to the mixing member, and a nut member screw-threaded to each curved connecting pipe and adjustable in a plane transversely of the center line of the corresponding supply pipe and also adjustable transversely of the center line of the corresponding coupling member.

9. In a device of the class described, the combination of spaced supply pipes, a mixing member, curved pipes secured to the inlets of the said mixing member, a coupling member secured to each of the said supply pipes, a head formed on each of said coupling members, a nut screw-threaded to each supply end of said curved pipes and having an enlarged bore formed therein to permit adjustment of the said nuts in a plane transverse to the center lines of said coupling members.

10. In a device of the class described, the combination of a connecting member adapted to be secured to a supply pipe and having a head formed at one end and of greater diameter than the body of the said connecting member, an annular recess formed in the said connecting member adjacent the said head, a nut member cooperating with said recess and adapted to be screw-threaded to a second pipe and having a bore formed in its end into which the said head is adapted to be inserted so as to permit relative adjustment of said coupling member and said nut in a plane transverse to their center lines.

Signed at Los Angeles, Calif., this 27 day of January, 1926.

MYRON J. GLAUBER.